US008911534B2

(12) United States Patent
Koros et al.

(10) Patent No.: US 8,911,534 B2
(45) Date of Patent: Dec. 16, 2014

(54) POLYIMIDE-BASED CARBON MOLECULAR SIEVE MEMBRANE FOR ETHYLENE/ETHANE SEPARATIONS

(75) Inventors: William J. Koros, Atlanta, GA (US); Meha Rungta, Atlanta, GA (US); Liren Xu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/980,402

(22) PCT Filed: Feb. 28, 2012

(86) PCT No.: PCT/US2012/026895
§ 371 (c)(1), (2), (4) Date: Jul. 18, 2013

(87) PCT Pub. No.: WO2012/148563
PCT Pub. Date: Nov. 1, 2012

(65) Prior Publication Data
US 2013/0333562 A1 Dec. 19, 2013

Related U.S. Application Data

(60) Provisional application No. 61/449,786, filed on Mar. 7, 2011.

(51) Int. Cl.
*B01D 53/22* (2006.01)
*B01D 67/00* (2006.01)
*B01D 71/02* (2006.01)

(52) U.S. Cl.
CPC .......... *B01D 53/228* (2013.01); *B01D 67/0067* (2013.01); *B01D 71/021* (2013.01); *B01D 71/028* (2013.01); *B01D 2256/16* (2013.01); *B01D 2257/7025* (2013.01); *Y02C 20/20* (2013.01); *B01D 2323/08* (2013.01)
USPC .................... 95/50; 95/43; 95/45; 96/4; 96/8; 96/10

(58) Field of Classification Search
CPC .... B01D 53/22; B01D 53/228; B01D 53/229; C07C 7/144
USPC ............................. 95/43, 45, 50; 96/4, 8, 10
See application file for complete search history.

(56) References Cited

U.S. PATENT DOCUMENTS

| | | | |
|---|---|---|---|
| 4,685,940 A | 8/1987 | Soffer et al. | |
| 5,288,304 A | 2/1994 | Koros et al. | |
| 5,670,051 A | 9/1997 | Pinnau et al. | |
| 5,695,818 A | 12/1997 | Soffer et al. | |
| 5,914,434 A | 6/1999 | Soffer et al. | |
| 5,925,591 A | 7/1999 | Soffer et al. | |
| 6,503,295 B1 * | 1/2003 | Koros et al. | 95/51 |
| 6,562,110 B2 * | 5/2003 | Koros et al. | 96/4 |
| 6,565,631 B2 | 5/2003 | Koros et al. | |
| 6,585,802 B2 * | 7/2003 | Koros et al. | 95/51 |
| 7,404,844 B2 * | 7/2008 | Tin et al. | 95/45 |
| 8,083,833 B2 * | 12/2011 | Liu et al. | 95/45 |
| 2002/0053284 A1 * | 5/2002 | Koros et al. | 95/51 |
| 2005/0235825 A1 * | 10/2005 | Tin et al. | 95/45 |
| 2007/0209506 A1 * | 9/2007 | Liu et al. | 95/45 |

FOREIGN PATENT DOCUMENTS

EP 459623 A1 12/1991

OTHER PUBLICATIONS

Journal of Membrane Science 170 (2000) 81-89 "X-ray diffraction analysis of dense PPO membranes" K.C. Khulbe.*
Ind. Eng. Chem. Res. 2002, 41, 357-366 "Spontaneous Interaction of Drops, Bubbles and Particles in Viscous Fluid Driven by Capillary Inhmnogeneities" Lavrenteva.*
K.M. Steel and W.J. Koros, Investigation of the Porosity of Carbon Materials and Related Effects on Gas Separation Properties, Carbon 41 (2003) 253-266.
Kiyono et al. (M. Kiyono, P.J. Williams & W.J. Koros),, Effect of Pyrolysis Atmosphere on Separation Performance of Carbon Molecular Sieve Membranes, Journal of Membrane Science 359 (Feb. 10, 2010).
D. Q. Vu & W. J. Koros, High Pressure CO2/CH4 Separation Using Carbon Molecular Sieve Hollow Fiber Membranes, Ind. Eng. Chem. Res. 41 (2002) 367-380.
Merkel, T. Separation of Olefin/Paraffin Mixtures with Carrier Facilitated Membranes; U.S. Department of Energy; 2007, pp. 1-79.
Koros, W. J., Evolving beyond the thermal age of separation processes: Membranes can lead the way, AlChl: Journal Oct. 2004, 50, No. 10, pp. 2326-2334.
Geiszler, V. C.; Koros, W. J.; Effects of polyimide pyrolysis conditions on carbon molecular sieve membrane properties. Industrial & Engineering Chemistry Research 1996, 35, (9) 2999-3003.
Fuertes, A. B.; Nevskaia, D. M.; Centeno, T. A., Carbon composite membranes from Matrimid ( R ) and Kapton ( R ) polyimides for gas separation. Microporous and Mesoporous Materials 1999, 33, (1-3), 115-125.
Barsema, J. N.; Klijnstra, S. D.; Balster, J. H.; Van Der Vogt, N. F. A; Koops, G. H.; Wessling, M., Intermediate polymer to carbon gas separation membranes based on Matrimid PI. Journal of Membrane Science 2004, 238, (1-2), 93-102.
Jones, C. W.; Koros, W. J., Carbon Molecular-Sieve Gas Seperation Membranes 1. Preparation and Characterization based on Polyimide precursors. Carbon 1994, 32, (8), 1419-1425.

(Continued)

*Primary Examiner* — Jason M Greene
*Assistant Examiner* — Anthony Shumate

(57) ABSTRACT

Carbon molecular sieve membranes having desirable selectivity for ethylene/ethane separations are prepared from a 3,3',4,4'-benzophenonetetracarboxylic acid dianhydride 5(6)-amino-1-(4'-aminophenyl)-1,3,3-trimethylindane 4,4-bismaleimidodiphenyl-methane (BTDA-DAPI) precursor solution that is then formed into films or hollow fibers which are pyrolyzed under vacuum or an inert atmosphere to form carbon molecular sieve membranes. Pyrolysis condition variables, including ramp rate, thermal soak time and temperature, are used to optimize the membrane's separation performance.

8 Claims, No Drawings

(56) References Cited

OTHER PUBLICATIONS

Steel, K. M.; Koros, W. J., An investigation of the effect of pyrolysis parameters on gas separation properties of carbon materials. Carbon 2005, 43, (9), 1843-1856.

Steel, K. M.; Koros, W. J., Investigation of Porosity of carbon materials and related effects on gas separation properties. Carbon 2003, 41, (2), 253-266.

Burns, R. L.; Koros, W. J., Defining the challenges for C3H6/C3H8 separation using polymeric membranes. Journal of Membrane Science 2003, 211, (2), 299-309.

Tanaka, K.; Taguchi, A.; Hao, J. Q.; Kita, H.; Okamoto, K., Permeation and separation properties of polyimide membranes to olefins and paraffins. Journal of Membrane Science 1996, 121(2), 197-207.

Clausi, D. T., Koros W. J. Formation of defect-free polyimide hollow fiber membranes for gas separations. Journal of Membrane Science, 2000, 167(1) p. 79-89.

Carruthers, S. B., Ramos, G. I., Koros, W. J., Morphology of integral-skin layers in hollow-fiber gas-separation membranes. Journal of Applied Polymer Science. 2003, 90(2), p. 399-411.

Clausi, D. T., McKelvey, S. A., Koros, W. J., Characterization of substructure resistance in asymmetric gas separation membranes. Journal of Membrane Science, 1999, 160(1) p. 51-64.

Yoshino, M. et al., Olefin/Paraffin separation performance of carbonized membranes derived from an asymmetric hollow fiber membrane of 6FDA/BPDA-DDBT copolyimide, Journal of Membrane Science, 2003, 215(1-2), p. 169-183.

Kiyono, M., et al., Effect of polymer precursors on carbon molecular sieve structure and separation performance properties, Carbon, 48, p. 4432-4441, 2010.

PCT/US2012/026895, International Search Report, 4 pgs; 2012.

PCT/US2012/026895, International Preliminary Report on Patentability, 27 pgs; 2012.

PCT/US2012/026895, Written Opinion of the International Searching Authority, 6 pgs; 2012.

* cited by examiner

US 8,911,534 B2

POLYIMIDE-BASED CARBON MOLECULAR SIEVE MEMBRANE FOR ETHYLENE/ETHANE SEPARATIONS

REFERENCE TO RELATED APPLICATIONS

This application is a non-provisional application claiming priority from the U.S. Provisional Patent Application No. 61/449,786, filed on Mar. 7, 2011, entitled "POLYIMIDE-BASED CARBON MOLECULAR SIEVE MEMBRANE FOR ETHYLENE/ETHANE SEPARATIONS" the teachings of which are incorporated by reference herein, as if reproduced in full hereinbelow.

BACKGROUND

1. Field of the Invention

This invention relates to the field of carbon molecular sieve membranes. More particularly, it relates to carbon molecular sieve membranes showing high selectivity in ethylene/ethane separations.

2. Background of the Art

Ethylene is one of the largest volume organic chemicals produced globally. Frequently produced commercially from petroleum and natural gas feedstocks, much of the production cost unfortunately goes into separation of ethylene ($C_2H_4$) from ethane ($C_2H_6$). Currently, $C_2H_4/C_2H_6$ separation is carried out almost exclusively by cryogenic distillation, which is an extremely energy-intensive process because of the relatively low relative volatility differential between $C_2H_4$ and $C_2H_6$ (1.75). A typical distillation may require a temperature of −25 degrees Celsius (° C.) and a pressure of 320 pounds per square inch gauge (psig) (approximately (~) 2.21 megapascals (MPa)). As a result, very large distillation towers, employing in some cases from 120 to 180 trays and high reflux ratios, are required, making it a very expensive separation.

Membrane technology provides an attractive alternative to such thermally driven separations, because it may require less energy and reduce environmental impact. Membranes are widely used for separation of liquids and gases. Gas transport through such membranes is commonly modeled by a sorption-diffusion mechanism, wherein gas molecules sorb at the upstream face of the membrane, diffuse through the membrane under a chemical potential gradient, and finally desorb at the downstream side of the membrane. Two intrinsic properties are used to evaluate the separation performance of a membrane material: its "permeability," a measure of the membrane's intrinsic productivity; and its "selectivity," a measure of the membrane's separation efficiency. "Permeability" is typically measured in Barrer, which is calculated as the flux ($n_i$) divided by the partial pressure difference between the membrane upstream and downstream ($\Delta p_i$), and multiplied by the thickness of the membrane (l).

$$P_i = \frac{n_i \, l}{\Delta p_i}$$

Another term, "permeance," is defined herein as the productivity of asymmetric hollow fiber membranes and is typically measured in Gas Permeation Units (GPU), which are calculated by dividing the permeability in Barrer by the membrane thickness in microns (μm)

$$\left(\frac{P_i}{l}\right) = \frac{n_i}{\Delta p_i}$$

Finally, "selectivity" is defined herein as the ability of one gas's permeability or permeance in comparison to the same property of another gas, to pass through the membrane. It is measured as a unitless ratio.

$$\alpha_{i/j} = \frac{P_i}{P_j} = \frac{(P_i/l)}{(P_j/l)}$$

Currently, polymers are the dominant membrane material used for gas separations because of their processability and selectivity for a variety of gas separations in general. The performance of these polymeric membranes is often, however, limited by an upper bound trade-off curve between productivity (permeability) and efficiency (selectivity). In addition polymeric membranes may be inadequate for high pressure applications of sorptive gases, for example, hydrocarbons, since they may undergo plasticization, which may result in significant loss in performance. Plasticization may be a particularly serious problem for asymmetric hollow fiber configurations.

In contrast, carbon molecular sieve (CMS) membranes have been discovered to be both robust and stable for certain high pressure applications (up to 1,000 pounds per square inch (psi), ~6.89 MPa), often with better separation performance than that of polymeric membranes for many gas separations. CMS membranes are typically produced by pyrolysis of polymer precursors under controlled conditions. For example, it is known that hollow fiber CMS membranes can be produced by pyrolyzing cellulose hollow fibers. In addition, many other polymers have been used to produce CMS membranes. Certain polyimide polymers have been found especially useful because of their high glass transition temperatures, desirable processability, and rigidity following pyrolysis.

For example, U.S. Pat. No. 6,565,631 describes a method of synthesizing a CMS membrane by pyrolyzing a commercial polyimide hollow fiber precursor in an evacuated environment following a ramp-soak temperature protocol to produce a high carbon content filamentary membrane. This membrane is described as being useful to separate carbon dioxide ($CO_2$) from a mixed stream of natural gas. For additional examples of production of high carbon content filamentary membranes, the reader may wish to also review U.S. Pat. Nos. 5,288,304 and 4,685,940 and EP Patent 459,623.

Another CMS membrane prepared from a polyimide is described in P. J. Williams, Carbon Molecular Sieves for Ethane-Ethylene Separation based on 6FDA and BPDA Polyimides, *AIChE Talk*, Nov. 2004. In that case, the starting precursor material is an exotic polyimide that is not commercially available and the CMS membranes are synthesized exclusively in dense film configurations and under vacuum only.

Research has shown that CMS membrane properties are affected by the following primary factors: (1) pyrolysis precursor, (2) precursor pretreatment conditions, (3) pyrolysis temperature, ramp rate and thermal soak time, (4) pyrolysis atmosphere and (5) post-treatment conditions. The effect of these factors on CMS performance for a variety of gas separations has been investigated by several researchers, but to date a stable, reproducible CMS membrane, readily and economically prepared from commercially available materials, configurable as both dense films and hollow fibers, and offering improved performance in $C_2H_4/C_2H_6$ separations, has not been identified.

SUMMARY OF THE INVENTION

Accordingly, in one embodiment the invention is an ethane/ethylene separation membrane prepared by a process comprising dissolving an amount of 3,3',4,4'-benzophenone_tetracarboxylic dianhydride 5(6)-amino-1-(4'-aminopheny)-1,3,3-trimethylindane (BTDA-DAPI) in a solvent such that a solution is formed; forming a film or hollow fibers from the solution; drying the film or the hollow fibers; and at least partially pyrolyzing the film or the hollow fibers under vacuum or in an inert atmosphere to form a carbon molecular sieve membrane therefrom, the carbon molecular sieve membrane having as a property differential diffusion of ethane and ethylene when ethylene and ethane are flowed therethrough, this property enabling utility of the carbon molecular sieve membrane as an ethane/ethylene separation membrane.

In another embodiment the invention is a process for separating ethane and ethylene from one another comprising flowing a mixture of gases including ethane and ethylene through the ethane/ethylene separation membrane as defined hereinabove.

DETAILED DESCRIPTION OF THE INVENTION

The carbon molecular sieve membranes of the invention are capable of sought-after levels of selectivity in separations of ethylene and ethane because they exhibit as a property a differential diffusion of the two gases therethrough, with optimization of separation performance being readily achieved via adjustments of pyrolysis temperature, thermal soak time and ramp rate as process variables in making the membranes.

One advantage of the invention is that an effective membrane may be prepared from a polyimide resin as a precursor. This resin is BTDA-DAPI, a thermoplastic polyimide. Particularly suitable herefor are commercially available powdered resins available from Huntsman International LLC under the tradename MATRIMID™, include MATRIMID™ resins bearing the designations 5218 and 9725, combinations thereof, and corresponding resins obtained from or produced by other sources.

The membrane may be configured in, as non-limiting embodiments, either a free-standing homogeneous dense film or as asymmetric hollow polymer fibers. In order to prepare a dense film, any suitable method of film preparation, such as solution casting, may be employed. In solution casting, the polyimide resin is first dissolved in a suitable solvent. Suitable solvents may include, for example, dichloromethane, tetrahydrofuran (THF), N-methyl-2-pyrrolidone (NMP), others in which the resin is substantially soluble, and combinations thereof. For purposes herein, "substantially soluble" means that solubility is effectively one hundred percent by weight (100 wt %), and at least 98 wt %. Particularly preferred as solvents in the present invention are dichloromethane, THF and combinations thereof, and most preferred is dichloromethane.

Because the resin as received may contain a certain amount of environmental moisture, it is desirable that, immediately prior to using it to prepare any carbon molecular sieve membrane of the invention, it is dried to remove this absorbed moisture. The drying may be carried out in, for example, a drying vacuum oven, desirably at a temperature ranging from 110° C. to 150° C., for a time period ranging from 6 hours (h) to 12 h, and preferably at least 6 h. Drying is considered to be completed once a steady weight is achieved. Other methods of drying such as heating in an inert gas purge may additionally or alternatively be employed.

Following drying the polyimide resin is added to and dissolved in the selected solvent in an amount such that a solution is formed. The concentration of this solution may vary according to whether the final configuration is to be a dense film, asymmetric hollow fibers, or a composite on a suitable robust ceramic or metal support. For example, a concentration ranging from 2 wt % to 20 wt %, preferably from 3 wt % to 15 wt %, more preferably from 3 wt % to 5 wt %, based upon the total solution weight, may be particularly suitable for forming suitable dense films. A concentration ranging from 15 wt % to 35 wt %, preferably from 18 wt % to 30 wt %, more preferably from 22 wt % to 28 wt % may be particularly suitable for spinning hollow fibers. This starting precursor solution is desirably thoroughly mixed, using means such as rollers, stirrer bars, impellers, combinations thereof, and the like, to ensure homogeneity. A mixing time ranging from 6 h to 24 h, desirably at least 6 h, is preferred to ensure homogeneity, which may help to reduce or eliminate defects in a final dense film membrane. For a hollow fiber membrane the starting precursor solution is desirably thoroughly mixed for a mixing time ranging from 6 h to 30 days, more preferably from 3 days to 10 days, and most preferably from 3 days to 7 days.

In another embodiment polymeric fibers may be spun into hollow fibers by any conventional method, for example, spun from a suitable precursor solution through a spinneret by a dry-jet/wet-quench process. Approaches for forming such fibers have been described in, for example, D. T. Clausi and W. J. Koros, Formation of Defect-free Polyimide, Hollow Fiber Membranes for Gas Separations, *Journal of Membrane Science*, 167 (2000) 79-89. For use in the invention, outer diameters ranging from 150 microns (μm) to 550 μm, preferably from 200 μm to 300 μm, and more preferably 250 μm, and inner diameters ranging from 75 μm to 275 μm, preferably from 100 μm to 150 μm, and more preferably 125 μm, may be particularly suitable. In some cases unusually thin walls (for example, thickness less than 30 μm) may be desirable to maximize productivity while maintaining desirable durability).

Once the precursor has formed the desired film or fibers, the film or fibers are at least partially, and desirably fully, pyrolyzed to form the final CMS films or fibers. The polymer precursor may be placed onto a suitable support, such as a ridged quartz plate or a stainless steel wire mesh support, and then placed in a suitable pyrolysis zone, such as a quartz tube which sits in a tube furnace, such as that produced by THERMCRAFT™. (THERMCRAFT™ is a tradename of Thermcraft Incorporated.)

Pyrolysis may be carried out under vacuum or in an inert gas atmosphere. In one preferred embodiment, the system is evacuated to a pressure less than or equal to 12 millitorr (mtorr, ~160 millipascals (mPa)). In another preferred embodiment, an inert argon purge gas atmosphere is employed.

One advantage of the invention is that optimization of the separation selectivity of the membrane may be achieved by way of fine-tuning of the pyrolysis conditions. The three critical variables to be considered include: the temperature set point(s) reached during the heating protocol; the ramp rate, which is the rate at which each temperature set point is reached; and the soak time, which is the total time at which the membrane is maintained at the final pyrolysis temperature.

Pyrolysis can be performed with a final temperature set point ranging from 500° C. to 1,000° C., more preferably from 500° C. to 800° C., still more preferably from 650° C. to 700° C., and most preferably from 650° C. to 675° C. In one embodiment a final temperature set point ranging from 650° C. to 675° C. may optimize performance for mixed gas $C_2H_4/C_2H_6$ separations. In the example protocols herein below, $T_{max}$ indicates the selected final temperature. "Soak" indicates thermal soaking.

For example, in one generalized embodiment the heating protocol may be sequenced as follows.

For final temperatures up to 550° C.:
Heating Protocol 1:
1. Heat from 50° C. to 250° C. at a ramp rate of 13.3° C. per minute (° C./min);
2. Heat from 250° C. to ($T_{max}$ minus 15)° C. at a ramp rate of 3.85° C./min;
3. ($T_{max}$ min 15)° C. to $T_{max}$° C. at a ramp rate of 0.25° C./min;
4. Soak for 2 h at $T_{max}$.

For final temperatures from greater than 550° C. up to 800° C.:
Heating Protocol 2:
1. Heat from 50° C. to 250° C. at a ramp rate of 13.3° C./min;
2. Heat from 250° C. to 535° C. at a ramp rate of 3.85° C./min;
3. Heat from 535° C. to 550° C. at a ramp rate of 0.25° C./min;
4. Heat from 550° C. to ($T_{max}$ minus 15)° C. at a ramp rate of 3.85° C./min;
5. Heat from ($T_{max}$ min 15)° C. to $T_{max}$° C. at a ramp rate of 0.25° C./min;
6. Soak for 2 h at $T_{max}$.

After the heating protocol is complete, the membrane is allowed to cool in place naturally to at least 40° C. while still under vacuum or a selected inert gas environment. In desirable embodiments the membrane demonstrates sufficient stability and rigidity for convenient removal from the pyrolysis zone and also for removal from the support upon which it is pyrolyzed.

Following pyrolysis the resulting CMS membrane comprising the pyrolyzed flat film or hollow fiber may be formed into a membrane module. The resulting pyrolyzed CMS membrane is, in particular embodiments, a carbon-rich (greater than 85 wt %) structure. This structure may be described as "turbostatic," which means that it is made up of disordered, $sp^2$-hybridized, essentially isotropic condensed hexagonal carbon sheets with very long range order. For additional discussion regarding structural possibilities, see also Marsh, Introduction to Carbon Science, Butterworths, 1989; Jenkins and Kawamura, Polymeric Carbons—Carbon Fiber, Glass and Char, Cambridge University Press London, 1976. The membrane's structure includes pores that are formed from packing imperfections and result in a slit-like pore structure that in certain particular embodiments exhibits a bimodal pore distribution. This includes both larger pores (micropores, having a minimum internal dimension ranging from 6 angstroms (Å) to 20 Å) connected by smaller pores (ultramicropores, having a minimum internal dimension less than 6 Å). Without wishing to be bound by any theory as to the mechanism by which the inventive membranes perform gas separations, including but not necessarily limited to ethane/ethylene separations, it is suggested that as the pyrolysis temperature is increased, the ultramicropore distribution shifts such that the overall average pore size is reduced. The result is an alteration in both gas permeability and selectivity, which are generally in inverse relationship.

The inventive CMS membranes may be used to carry out gas separations, at a variety of scales including but not limited to laboratory, pilot plant, and full industrial scale. In general, the inventive membranes operate to enable differential diffusion of ethane and ethylene when ethylene and ethane are diffused therethrough. For example, flat CMS dense films may be loaded into permeation cells for laboratory scale testing using a constant-volume variable-pressure permeation system. For additional details of an exemplary laboratory scale testing, see, for example, K. M. Steel and W. J. Koros, Investigation of the Porosity of Carbon Materials and Related Effects on Gas Separation Properties, *Carbon* 41 (2003) 253-266. In another preferred embodiment, a CMS fiber module, as described in U.S. Pat. No. 6,565,631, may be constructed for a similar laboratory test protocol. For industrial scale applications, a CMS fiber module containing a suitable plurality of fibers may be operated as, for example, a shell-tube heat exchanger. In this embodiment a high pressure feed mixture of $C_2H_4/C_2H_6$ may be fed to the shell-side of the assembly such that at least a portion of the $C_2H_4$ in the feed passes through the membrane. The $C_2H_4$-enriched product may then be collected from the tube-side. It is also possible to include a membrane module in parallel with a previously-installed distillation column. In this case the hybrid system may provide an efficiency upgrade to the previous distillation-only system. In general industrial scale separations may be desirably carried out at temperatures other than those used for laboratory scale testing.

Of particular advantage is that when one of the embodiments of the inventive membranes is used in a $C_2H_4/C_2H_6$ separation as described herein, the membrane may exhibit a $C_2H_4$ permeance of at least 0.25 GPU, more preferably at least 0.5, and most preferably at least 1. $C_2H_4/C_2H_6$ selectivity may desirably range from at least 9, more preferably at least 10, and most preferably at least 12. In preferred embodiments the $C_2H_4$ permeance may be at least 0.25 and the $C_2H_4/C_2H_6$ selectivity may be at least 9. In more preferred embodiments the $C_2H_4$ permeance may be at least 0.5 GPU and the $C_2H_4/C_2H_6$ selectivity at least 10. In still more preferred embodiments the $C_2H_4$ permeance may be at least 1 GPU and the $C_2H_4/C_2H_6$ selectivity at least 12.

EXAMPLES

Examples 1-6 and Comparative Example A

MATRIMID™ 5218, a BTDA-DAPI thermoplastic polyimide powder, is obtained commercially from Huntsman International LLC. The polymer powder is first dried in a vacuum oven at 120° C. for at least 12 h to remove moisture. The dried powder is then dissolved in dichloromethane (at least 99.8% purity, Sigma-Aldrich) to form a 3 to 5 wt % polymer solution and the solution is placed on rollers for at least 6 h for mixing. The polymer solution is used to prepare dense films by a solution casting method in a glove bag at room temperature to achieve a slow evaporation rate (3 to 4 days) and the vitrified films are then removed and dried in a vacuum oven at 120° C. for at least 12 h to remove residual solvent. The dried films are then cut into 2.22 centimeter (cm) discs for pyrolysis. All films have a thickness of 70±10 μm for the sake of consistency.

The polymer films cut in small discs are then pyrolyzed under vacuum (less than or equal to (≤) 12 mtorr, (mtorr, ~160 millipascals (mPa)). Pyrolysis is performed at maximum temperatures ranging from 500° C. to 800° C., specifically at 500° C., 525° C., 550° C., 650° C., 675° C., and 800° C., using Heating Protocol 1 as described hereinabove where the final pyrolysis temperature is 500° C., 525° C. or 550° C., and Heating Protocol 2 where the final pyrolysis temperature is 650° C., 675° C. or 800° C.

A permeation cell is prepared for a non-pyrolyzed MATRIMID™ 5218 precursor dense film (Comparative Example A) and for each CMS film (Examples 1-6). A permeation cell is then placed in a constant-volume permeation system. For each permeation test, the entire system is first evacuated for at least 24 h and a leak rate is measured (less than (<) 1 percent (%) of the permeation rate of the slowest gas). After evacuation, the upstream is pressurized with feed gas (pure $C_2H_4$ or pure $C_2H_6$) while the downstream is kept at vacuum. The system temperature is allowed to stabilize at 35° C. and then the upstream face of the membrane is exposed to ~50 pounds per square inch absolute pressure (psia) feed gas. The pressure rise in a constant, known downstream volume is recorded over time using a LABVIEW™ instrument (available from National Instruments, Austin, Tex.) until steady state is achieved. A set of permeation experiments for $C_2H_4$ and $C_2H_6$ on each film is used to calculate the $C_2H_4$ permeability and $C_2H_4/C_2H_6$ selectivity. The results are shown in Table 1.

TABLE 1

| | Maximum Pyrolysis Temperature ° C. | $C_2H_4$ Permeability Barrer | $C_2H_4/C_2H_6$ Selectivity |
|---|---|---|---|
| Comparative Example A | Precursor (no pyrolysis) | 0.4-0.5 | 4.5 |
| Example 1 | 500 | 106 | 3.6 |
| Example 2 | 525 | 54 | 4.9 |
| Example 3 | 550 | 16 | 6.3 |
| Example 4 | 650 | 15.1 | 11.8 |
| Example 5 | 675 | 14.7 | 12.1 |
| Example 6 | 800 | <0.2 | >12 |

As the table shows, all of the CMS (i.e., pyrolyzed; Examples 1-6) dense film membranes show $C_2H_4/C_2H_6$ separation performance that is enhanced in comparison with the non-pyrolyzed dense film (Comparative Example A). In all instances either $C_2H_4$ permeability or $C_2H_4/C_2H_6$ selectivity is greater for the Examples than for the Comparative, and in most instances both are increased. Table 1 also shows that, overall, as pyrolysis temperature increases, $C_2H_4$ permeability decreases and $C_2H_4/C_2H_6$ selectivity increases or remains constant. Table 1 suggests that an optimum pyrolysis temperature for this embodiment may lie in the range of from 650° C. to 675° C. for these membranes, with a $C_2H_4$ permeability of 13-14 Barrer, which is much higher than Comparative Example A's $C_2H_4$ permeability of 0.4-0.5 Barrer. Furthermore, with pyrolysis in the same temperature range, a $C_2H_4/C_2H_6$ selectivity of ~12 may be attained, which is again much higher than Comparative Example A's $C_2H_4/C_2H_6$ selectivity of 4.5.

Examples 7-13 and Comparative Example B

MATRIMID™ 5218 polymer powder is first dried in a vacuum oven at 110° C. overnight to remove moisture and residual solvents. A spinning dope (MATRIMID™ 26.2 wt %; N-methyl-2-pyrrolidone (NMP) 53 wt %; ethanol (EtOH) 14.9 wt %; tetrahydrofuran (THF) 5.9 wt %) is then made in a QORPAK™ glass bottle sealed with a TEFLON™ polytetrafluoroethylene cap and dissolved by placing on a roller. (QORPAK™ is a tradename of Qorpak, a division of Berlin Packaging; TEFLON™ is a tradename of E.I. du Pont de Nemours, Inc.) Once the dope is homogeneous (this requires several days), it is loaded into a 500 milliliter (mL) syringe pump and allowed to degas overnight. Bore fluid is then loaded into a separate 100 mL syringe pump. The dope and bore fluid are then co-extruded through a spinneret. Both the dope and the bore fluid are filtered in-line between the delivery pumps and the spinneret with 60 μm and 2 μm metal filters, respectively. Temperature control is applied for the spinning process. Thermocouples are placed on the spinneret, the dope filter and the dope pump. After passing through an air gap, the nascent membrane is immersed into a water quench bath. The phase-separated fiber spin line is collected by a 0.32 meter (m) diameter polyethylene drum after passing over TEFLON™ guides. Once cut from the take-up drum, the fibers are rinsed in at least four separate water baths over a course of 48 h. The fibers are then solvent exchanged in glass containers with three separate 20 minute (min) methanol baths followed by 3 separate 20 min hexane baths and dried under vacuum at 75° C. for 3 h. Average fiber wall thickness for the precursor fibers is above 50 μm. The spinning parameters are detailed in Table 2. For additional details concerning spinning in general, it is suggested that reference be made to D. T. Clausi and W. J. Koros, Formation of Defect-free Polyimide Hollow Fiber Membranes for Gas Separations, *Journal of Membrane Science*, 167 (2000) 79-89, previously cited hereinabove.

TABLE 2

| Dope composition (wt %) | 26.2 wt % MATRIMID ™ BTDA-DAPI resin, 53 wt % NMP, 14.9 wt % EtOH, 5.9 wt % THF |
|---|---|
| Bore fluid composition (wt %) | 85 wt % NMP, 15 wt % $H_2O$ |
| Dope/bore fluid flow rate (mL/h) | 180/60 |
| Spinning temperature (spinneret) (° C.) | 60 |
| Water quench temperature (° C.) | 47 |
| Air gap (cm)* | 10 |
| Take-up rate (m/min)** | 15 |

*centimeters
**meters per minute

The precursor hollow fibers are then placed on a stainless steel wire mesh plate and bound separately with stainless steel wires. The pyrolysis is performed under vacuum (less than or equal to 12 mtorr, (mtorr, ~160 mPa)). The heating protocols used are as described in Examples 1-6, with final temperatures at 500° C., 550° C., 600° C., 650° C., 700° C., 750° C., 800° C., respectively, and are designated as Examples 7-13. A portion of the fibers are not pyrolyzed and are used to form a membrane module for Comparative Example B.

The fibers are then used to construct membrane modules. A hollow fiber, or multiple hollow fibers, is/are put into a ¼ inch (outside diameter, OD) stainless steel tubing, and then the end(s) are connected to a couple of ¼ inch female and male (national pipe taper, NPT) tube adapters, and finally sealed with epoxy. Permeation tests are performed in constant-volume systems, using the test procedure described in Examples 1-6 and Comparative Example A. The system is completely evacuated overnight and leak-tested prior to each permeation test. The upstream is pressurized with feed gas (pure $C_2H_4$ or pure $C_2H_6$), while the downstream remains at vacuum. The system temperature is allowed to stabilize at 35° C. The upstream feed pressure is kept at 100 psia (0.689 MPa). The pressure rise is recorded as in the previous Examples and used to calculate the permeance and selectivity of the membrane. Results are shown in Table 3.

TABLE 3

| | Maximum Pyrolysis Temperature ° C. | $C_2H_4$ Permeance GPU | $C_2H_4/C_2H_6$ Selectivity |
|---|---|---|---|
| Comparative Example B | Precursor (no pyrolysis) | 0.99 | 4.1 |
| Example 7 | 500 | 1.25 | 3.5 |
| Example 8 | 550 | 0.94 | 6.3 |
| Example 9 | 600 | 0.51 | 8.7 |
| Example 10 | 650 | 0.28 | 9.8 |
| Example 11 | 700 | 0.25 | 12.6 |
| Example 12 | 750 | 0.046 | 13.8 |
| Example 13 | 800 | 0.017 | 13.8 |

As Table 3 illustrates, as pyrolysis temperature is increased, $C_2H_4/C_2H_6$ selectivity increases and is comparable to the selectivity shown in Examples 1-6. At the same time the $C_2H_4$ permeance decreases. The optimum final pyrolysis temperature for $C_2H_4/C_2H_6$ separation appears to range from 650° C. to 700° C., with a $C_2H_4/C_2H_6$ selectivity of ~12 and a $C_2H_4$ permeance of 0.25 GPU.

Example 14

An asymmetric hollow fiber membrane is prepared as in Examples 7-13, but using Heating Protocol 3 as follows.
Heating Protocol 3:
1. Heat from 50° C. to 600° C. at a ramp rate of 10° C./min;
2. Heat from 600° C. to 675° C. at a ramp rate of 2° C./min;
1. Soak for 10 min at 675° C.

This protocol saves more than 4 h in total pyrolysis time compared to Heating Protocol 2 and is therefore more favorable for scale-up due to the substantial energy saving. Heating Protocol 3 surprisingly shows at least a 50% increase in $C_2H_4$ permeance (~0.4 GPU) and a high $C_2H_4/C_2H_6$ selectivity of 11.7.

Example 15

Thin-walled precursor fibers are spun using the procedure of Examples 7-13, but with the specific conditions as shown in Table 4. The result is hollow fibers having an average fiber wall thickness of about 20 µm. These thin-walled precursor fibers are pyrolyzed under vacuum using Heating Protocol 3, as described in Example 14.

TABLE 4

| | |
|---|---|
| Dope composition (wt %) | 25 wt % MATRIMID ™ BTDA-DAPI resin, 52 wt % NMP, 12 wt % EtOH, 11 wt % THF |
| Bore fluid composition (wt %) | 90 wt % NMP, 10 wt % $H_2O$ |
| Dope/bore fluid flow rate (mL/h) | 200/200 |
| Spinning temperature (spinneret) (° C.) | 60 |
| Water quench temperature (° C.) | 23 |
| Air gap (cm) | 15 |
| Take-up rate (m/min) | 60 |

The resulting thin-walled CMS hollow fibers show a $C_2H_4$ permeance of ~1 GPU and a $C_2H_4/C_2H_6$ selectivity of ~10. This suggests that reducing the fiber wall thickness increases $C_2H_4$ permeance without significantly compromising selectivity.

Example 16

The thin-walled hollow fibers procedure described in Example 15 is followed except that, instead of drawing a vacuum during pyrolysis, a controlled flow of argon purge gas is used. A needle valve is used to control the flow rate of the argon, with the flowrate being monitored throughout the pyrolysis using a universal gas flowmeter (Agilent Technologies, ADM1000). The gas flow rate is 200 cubic centimeters per minute (cc/min). The pyrolysis protocol is Heating Protocol 3, as described in Example 14.

The resulting membrane exhibits a $C_2H_4$ permeance of 1 GPU and a $C_2H_4/C_2H_6$ selectivity of ~9. The results are very similar to those of the vacuum pyrolysis preparation of Examples 15.

Example 17

Mixed gas permeation tests are performed on the CMS hollow fiber membranes prepared in Examples 15 and compared with pure gas tests. The gas feed used in these laboratory scale tests as the mixed gas feed is similar to the feed currently employed for some current industrial scale distillation columns The feed composition is 63 mole percent (mol %) $C_2H_4$ and 37 mol % $C_2H_6$, and a feed pressure of approximately 350 psi (2.41 MPa) and a temperature of 35° C. are employed. Permeation results are obtained as in previous Examples, and recorded in Table 5 for the mixed gas along with the pure gas permeation results obtained in Example 15 for comparison.

TABLE 5

| | Test 1 (Example 15) | Test 2 (Example 17) | Test 3 (Example 15) |
|---|---|---|---|
| Test condition (35° C.) | 100 psia, pure gas | 350 psia, mixed gas | 220 psia $C_2H_4$, 130 psia $C_2H_6$, pure gases |
| Permeance $(P/1)_{C2H4}$ (GPU) | 1.08 | 0.87 | 0.89 |
| Selectivity $\alpha_{C2H4/C2H6}$ | 11.1 | 11.1 | 10.5 |

The results in Table 5 show that at high pressure (Test 2), the mixed gas selectivity is comparable to the pure gas selectivity at lower pressure (Test 1). Ethylene permeance, however, decreases as pressure increases (Test 2 versus Test 1). To determine the reason behind this, Test 3 is carried out and shows a result close to that of Table 2 (0.89 GPU versus 0.87 GPU), where the partial pressures of each of the two gases present is taken into account. This leads to the conclusion that the permeance decrease is attributable to the pressure dependence of permeability, i.e., application of the Langmuir sorption isotherm. This supports a conclusion that the performance of the membrane for an ethane/ethylene separation under realistic industrial scale conditions is likely comparable to that under laboratory scale conditions.

What is claimed is:

1. An ethane/ethylene separation membrane prepared by a process comprising dissolving an amount of 3,3',4,4'-benzophenone tetracarboxylic dianhydride 5(6)-amino-1-(4'-aminopheny)-1,3,3-trimethylindane in a solvent such that a solution is formed; forming asymmetric hollow fiber precursors from the solution; at least partially drying the asymmetric hollow fiber precursors with a second solvent; solvent-exchanging the asymmetric hollow fiber precursors in hexane; and at least partially pyrolyzing the asymmetric hollow fiber precursors under vacuum or in an inert atmosphere to form an asymmetric hollow fiber carbon molecular sieve membrane therefrom, the asymmetric hollow fiber carbon molecular sieve membrane having an ethylene permeance of at least 0.25 Gas Permeation Units and an ethylene/ethane selectivity of at least 6.3.

2. The membrane of claim 1 wherein the pyrolyzing is carried out to a temperature ranging from 500° C. to 800° C.

3. The membrane of claim 1 wherein the pyrolyzing is carried out to a temperature ranging from 650° C. to 700° C.

4. The membrane of claim 1 wherein the pyrolyzing is done according to a protocol wherein the asymmetric hollow fibers are heated first from 50° C. to 600° C. at a ramp rate of 10° C./minute; then from 600° C. to 675° C. at a ramp rate of 2° C./minute; then soaked for 10 minutes at 675° C.

5. A process for separating ethane and ethylene from one another comprising flowing a mixture of gases including ethane and ethylene through an ethane/ethylene separation membrane prepared by a process including dissolving an amount of 3,3',4,4'-benzophenone tetracarboxylic dianhydride 5(6)-amino-1-(4'-aminopheny)-1,3,3-trimethylindane in a solvent such that a solution is formed; forming asymmetric hollow fiber precursors from the solution; at least partially drying the asymmetric hollow fiber precursors with a second solvent; solvent-exchanging the asymmetric hollow fiber precursors in hexane; and at least partially pyrolyzing the asymmetric hollow fiber precursors under vacuum or in an inert atmosphere to form an asymmetric hollow fiber carbon molecular sieve membrane therefrom, the asymmetric hollow fiber carbon molecular sieve membrane having an ethylene permeance of at least 0.25 Gas Permeation Units and an ethylene/ethane selectivity of at least 6.3; under conditions such that the ethylene and the ethane are separated from one another.

6. The process of claim 5 wherein the carbon molecular sieve membrane has an ethylene permeance of at least 0.25 Gas Permeation Units and an ethylene/ethane selectivity of at least 9.

7. The process of claim 5 wherein the carbon molecular sieve membrane has an ethylene permeance of at least 0.5 Gas Permeation Units and an ethylene/ethane selectivity of at least 10.

8. The process of claim 5 wherein the carbon molecular sieve membrane has an ethylene permeance of at least 1 Gas Permeation Units and an ethylene/ethane selectivity of at least 12.

* * * * *